Figure 1:
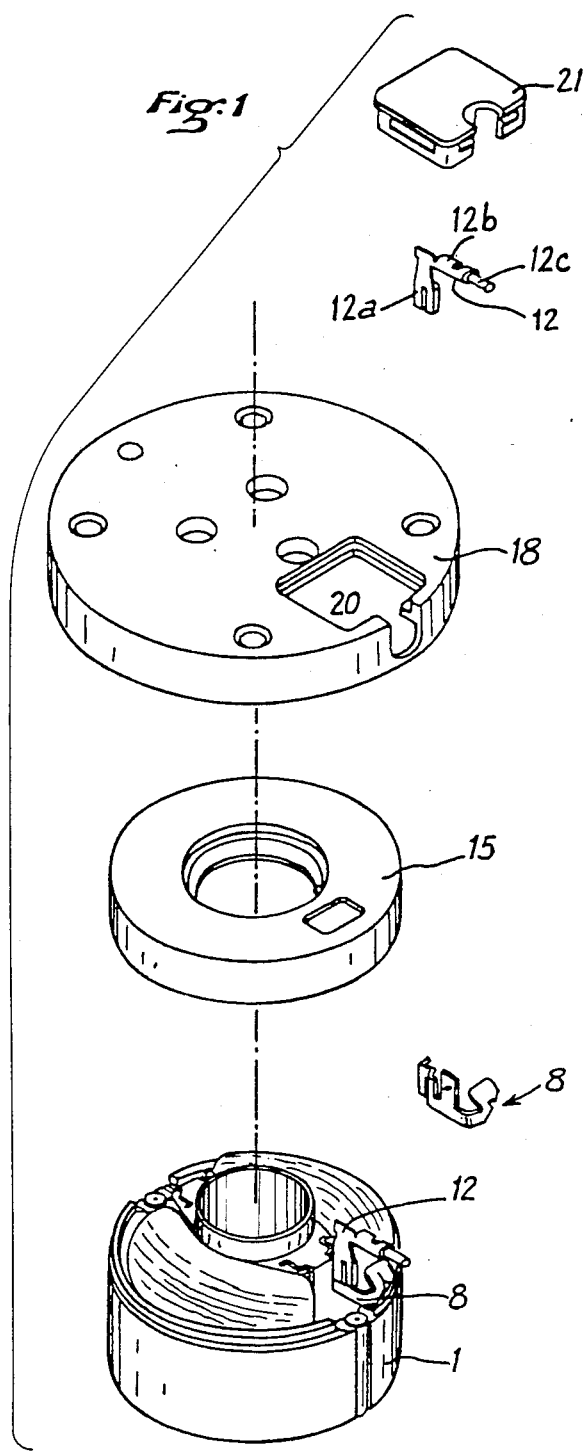

United States Patent [19]

Best

[11] Patent Number: 4,707,627
[45] Date of Patent: Nov. 17, 1987

[54] EXTERNAL ROTOR MOTOR WITH CONNECTING PLUG CONNECTION

[75] Inventor: Dieter Best, Ingelfingen, Fed. Rep. of Germany

[73] Assignee: ebm Elektrobau Mufingen GmbH & Co., Fed. Rep. of Germany

[21] Appl. No.: 808,040

[22] Filed: Dec. 12, 1985

[30] Foreign Application Priority Data

Dec. 29, 1984 [DE] Fed. Rep. of Germany ....... 3447826

[51] Int. Cl.$^4$ .............................................. H02K 11/00
[52] U.S. Cl. ........................................ 310/71; 310/42; 310/89; 310/260; 336/192; 439/425
[58] Field of Search ................. 310/71, 89, 67 R, 254, 310/258, 179, 216, 42, 59, 260; 336/192; 339/97 R, 276

[56] References Cited

U.S. PATENT DOCUMENTS

| | | | |
|---|---|---|---|
| 2,417,195 | 3/1947 | Hargreaves | 310/89 UX |
| 2,802,958 | 8/1957 | Curley | 310/71 |
| 3,502,917 | 3/1970 | Bizoe | 310/71 |
| 3,809,798 | 5/1974 | Simon | 310/71 |
| 3,826,935 | 7/1974 | Grierson | 310/89 |
| 4,612,468 | 9/1986 | Stürm et al. | 310/67 R |

FOREIGN PATENT DOCUMENTS

| | | | |
|---|---|---|---|
| 0066644 | 12/1982 | European Pat. Off. | 310/71 |
| 1763353 | 8/1971 | Fed. Rep. of Germany | 310/71 |
| 2136170 | 2/1973 | Fed. Rep. of Germany | 310/71 |
| 1930359 | 8/1978 | Fed. Rep. of Germany | 310/71 |
| 8026597 | 1/1981 | Fed. Rep. of Germany | 310/71 |
| 0049650 | 5/1981 | Japan | 310/71 |

Primary Examiner—R. Skudy
Attorney, Agent, or Firm—Goodman & Teitelbaum

[57] ABSTRACT

An electric external rotor motor with a stator piled up of individual plates, in the grooves of which stator there are laid windings, and with an external rotor bell enclosing the stator on one side forming the rotor, the bearing elements of the rotor being accommodated inside face insulation shafts of the stator plate pack, and with a motor flange fastened to the side of the stator lying opposite the rotor, as well as with a motor connection cable connected inside the motor with the winding ends, in which the connection of the ends of the stator windings with the motor connection cable (12c) occurs by plug connections (8, 12) through the motor flange (18), for which contact lugs (8) are supported on a wall facing the motor flange (18), the wall being of the insulation disposed between stator plate pack (1) and stator winding.

8 Claims, 7 Drawing Figures

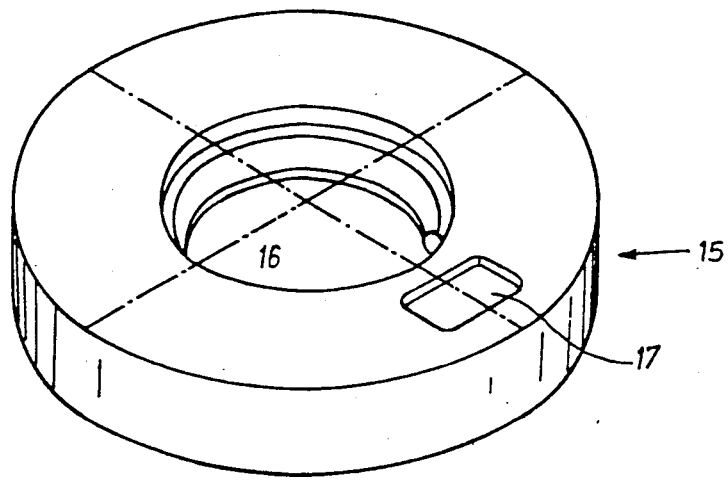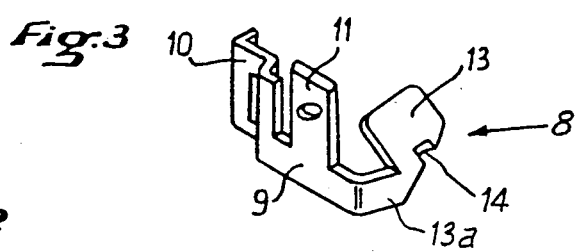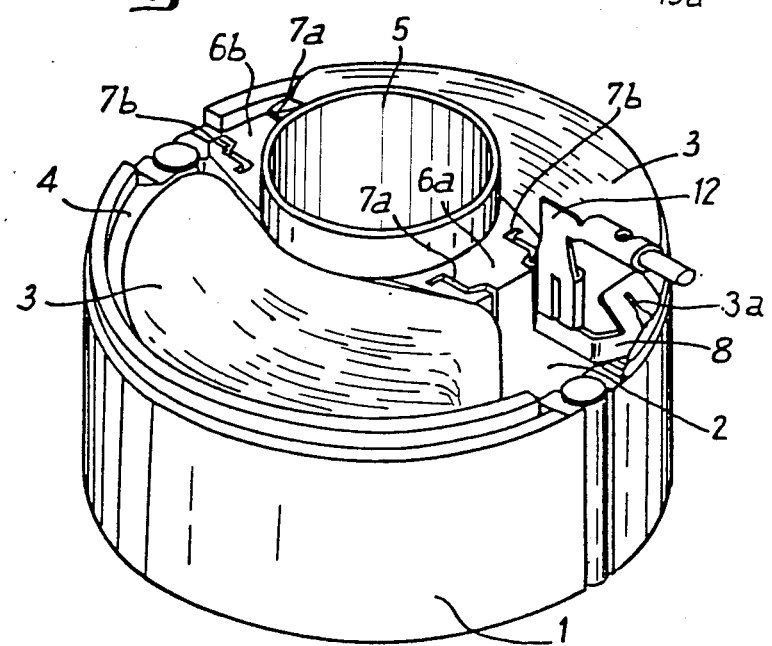

EXTERNAL ROTOR MOTOR WITH CONNECTING PLUG CONNECTION

The invention relates to an electric external rotor motor with a stator layered out of individual plates, in the grooves of which windings are laid, and with an external rotor forming the rotor, surrounding the stator on one side, the bearing elements of the rotor being accommodated inside face insulation shafts of the stator plate pack, and with a motor flange fastened to the side of the stator lying opposite the rotor, as well as with a motor connecting cable being connected inside the motor with the winding ends.

This motor construction type is already known and by reason of the compact construction is gladly used especially in small electric tools such as shown for example in U.S. Pat. No. 4,612,468. A disadvantage of this compact construction, however, is the very crowded space that is available for the connection of the stator windings with the motor connecting cables.

From German Pat. No. 21 36 170 there is known an external rotor motor in which the motor connecting strands are led from the flange side of the motor axially parallel through an axial groove of the stator plate pack to the side of the stator facing the rotor. There the winding ends are connected by clamp plates with the strand ends and the connection places that have thus arisen are interred into pocket-form cavities of the upper winding cover plate radially. Through the deflection one to several times of the connecting strands in the cavities of the coil insulation part there is achieved a tension relief of the connecting places. The manufacture of such a motor, however, is very-time consuming, since by reason of its very small dimensions the introduction of the connecting places into the cavities is difficult, especially since, in consequence of the thin winding wires, there cannot be excluded the danger of a wire breakage.

Another external rotor motor is known from German published patent application AS No. 19 30 359, in which an annular conductor plate with printed-on copper conductor paths is fastened to the collet of an insulating material disk lying on the face side of the stator plate pack. To the conductor paths there are soldered both the winding ends and also the motor connection strands.

Besides the difficult manufacturing process by reason of the constricted spatial relations in the connecting zone, in both known motors there appears the disadvantage that the entire further final production of the motor is encombered with the connecting cables. Since the stators provided with motor windings and connecting cables often still have to be processed by grinding or turning, it is required in such cases to accommodate the connecting strands inside the processing machine. Furthermore, in the case of the known motors there must be manufactured customer-specific stators which often differ only in the different lengths of the motor connecting cables.

Underlying the invention is the problem of developing an external rotor motor in which the motor connecting cable can be connected only after the final assembly of the motor, rapidly and without complication.

According to the invention this is achieved by the means that connection of the stator windings with the motor connecting cable occurs by means of plug connections through the motor flange, for which purpose contact parts are mounted on the wall of the the insulation facing the motor flange between stator plate pack and stator winding.

This type of connection of a plug connection between the motor windings and the motor connecting cables has hitherto been known only in the case of internal rotor motors. Such as internal rotor motor with connecting plug connection is described in German utility model GM No. 80 26 597. Here, in each case, a connecting clamp is provided with a clamping and welding zone, upon which there follows a conducting yoke turnning out as a contact lug. On these contact lugs there can be directly emplaced either the connecting plugs of a cable or a conductor plate provided with plug sockets. A transfer of this type of connection from an internal rotor motor to an external rotor motor, however, is by no means an obvious idea, since in external rotor motors in the region of the connecting places between stator windings and connecting cables there are present extremely rstricted spatial relations and, furthermore, the stator is virtually inaccessible through the external rotor bell on the one hand and through the motor flange on the other hand.

As a result of the advantageous connecting plug connection of the motor of the invention there is eliminated the expensive stocking of customer-specific motors. The cables can be packaged and connected rapidly and without problems according to the wish of the customer. There the connecting strands are preferably provided with connecting plugs the plugging zones of which enclose a right angle with their clamping zones for the motor connecting strands, in order to achieve a tension relief of the connecting plates between the stator winding ends and the connecting strands and to avoid wire breakages of the thin, delicate winding wire.

Further, it is expedient with use of a motor flange made of metal to provide an insulating winding-head cover cap, which just as the motor flange itself, presents in the zone of the contact lugs a connecting opening for the lead-through of the connecting plugs. In another advantageous execution of the motor of the invention the motor flange itself can be made of plastic, whereby an insulating cover cap becomes unnecessary. Often the motor flange is constructed as part of an electric apparatus, for example, a fan housing, so that depending on material for this apparatus part functioning as a flange, a cover cap is to be provided or not.

Further advantageous development features of the invention are evident from the following specification.

With the aid of the embodiment represented in the drawings, in the following the invention is explained in detail.

Figure 7:
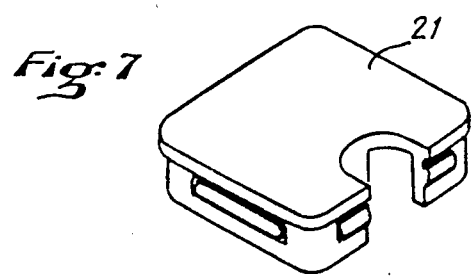
Figure 6:
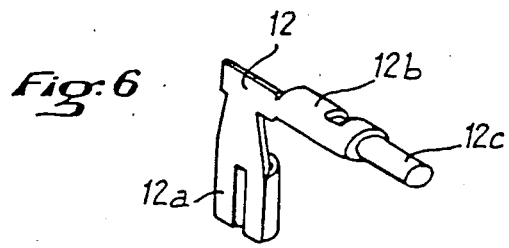
Figure 5:
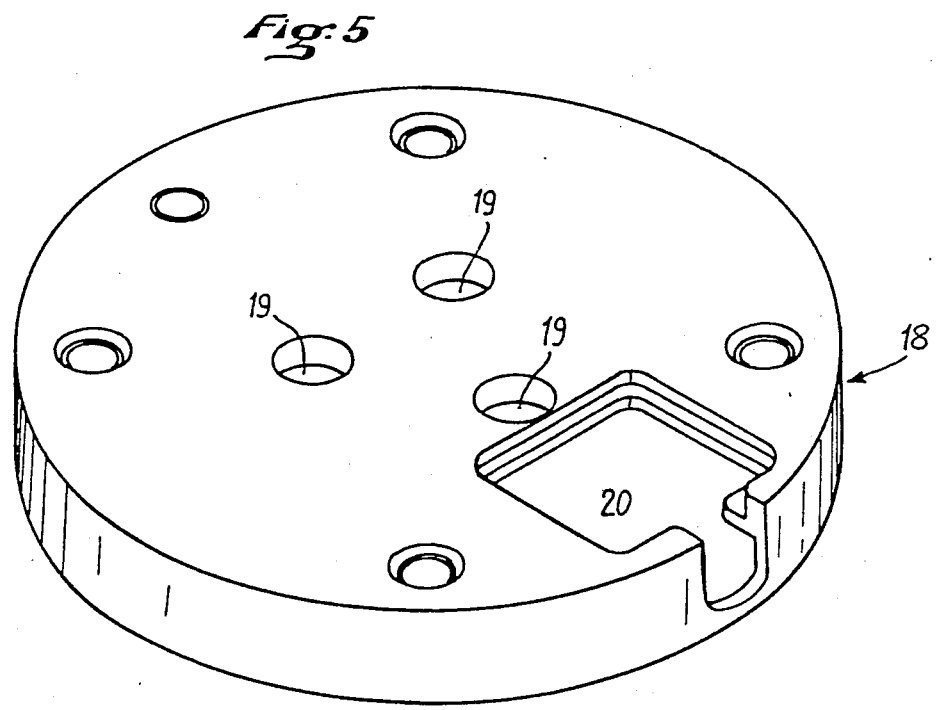

FIG. 1 shows a perspective exploded representation of a stator assembly for an external rotor motor according to the invention;

FIG. 2 the stator of the motor according to FIG. 1;

FIG. 3 a contact lug according to FIG. 1 and FIG. 2;

FIG. 4 an insulating winding-head cover cap according to FIG. 1;

FIG. 5 a motor flange according to FIG. 1;

FIG. 6 a connecting plug of the motor connecting cable according to FIG. 1 and FIG. 2;

FIG. 7 a cover for closing the connection opening in the motor flange according to FIG. 1.

As is evident from FIGS. 1 and 2, a stator assembly for an external rotor motor (not shown in the drawings) according to the invention consists of a stator 1 built up of individual plates, into the grooves 2 of which there are accommodated windings 3. For the insulation of these stator windings 3 with respect to the stator plate pack the latter is surrounded both on face sides and also inside the grooves 2 completely with plastic. On both face sides of the stator this plastic layer forms walls 4, to which in each case there is applied a face insulation shaft 5. These face insulation shafts 5 serve for the insulation of the stator windings against the bearing carrying tube (not represented) and for the reception of bearing elements. According to the invention, on both sides of the stator 1 on the face insulation shafts 5 in each case two added pieces 6a, 6b, likewise consisting of an insulating material, lie diametrally opposite in radial direction to the grooves 2. These addded pieces 6a, 6b present in each case two slit openings or slots 7a, 7b, which extend in axial direction into the added pieces and serve for the reception of contact lugs 8. For this, these slit openings or slots 7a, 7b are open both in the direction of the motor axis and also in radial direction. The insulation between stator plate pack and the windings, the face insulation shafts 5 as well as the added pieces 6a, 6b can advantageously be sprayed on in one or several working steps of synthetic material or be applied in another manner.

In FIG. 3 there is represented an advantageous contact lug 8 with a base area 9. A holder area 10 serves for the plugging of the contact lug into the receiving slots 7a, 7b provided for this in the added pieces 6a, 1 6b. For this purpose holder area 10 and receiving slots 7a, 7b are adapted to one another in their cross section, and, namely, in a plan view to the stator 1 of the motor of the invention in the direction of the motor axis these reception slots 7a, 7b as well as the holder areas 10 have a cross section that is multiply angled-off. This multiple angling-off of the holder area cross section assures a firm seating of the contact lug 8 in the groove opening 2 and offers the advantage of a good tension relief of the connection. In the middle portion of the advantageous contact lug 8 there extends an appropriate connecting tongue 11 parallel and analogously to the holder area 10 in axial direction away from the stator; this tongue serves for the connection of a motor cable provided with connecting plugs 12. On the side of the contact lug lying opposite the holder area 10 there is provided an advantageous connecting surface 13 for the motor winding ends 3a. The thin winding wires are led through a notch 14 on the edge, facing the stator, of the connecting surface 13, where the soldering or welding occurs. For the connection of the winding ends it is expedient that the connecting surface 13 of the contact lug 8 extends from the base area 9 lying deep in the added pieces 6a and 6b, respecitvely away from the stator in the direction of the motor axis, whereby the soldering or welding can be performed without danger to the windings themselves. If the contact lugs 8 are inserted with their holder area 10 into the receiving slots 7a, 7b then according to the invention there is present an arrangement such that the contact lugs 8 lie in each case in pairs in axial extension of the grooves 2 of the stator 1. If one looks in the direction of the motor axis at the stator, the contact lugs 8 of each pair lie advantageously on both sides of the symmetry line of stator 1 running radially through the grooves 2, so that the contact lugs of each pair are parallel to one another. There it is especially advantageous that the two end zones, therefore holder area 10 as well as connecting surface 13, are at an angle outward away from this immaginary line of symmetry. It is expedient, further, if the stator winding connecting surfaces 13 are in each case at an angle inward, i.e., in the direction of the stator center. Furthermore, it is provided according to the invention that each contact lug 8 is seated in one of the reception slots 7a, 7b in such a way that the holder area 10 is fully lowered in the added pieces 6a, 6b and the upper edge of the connecting tongue 11 lies about at the same height as these added pieces 6a, 6b. It is noted, that the angled portion 13a of the connecting surface 13 of each of the contact lugs 8 is supported on the wall 4 of insulation, as best shown in FIG. 2.

The advantages formation described of the contact lugs 8 in connection with the sunken seating in the added pieces 6a, 6b is of greatest importance for a connecting plug connection in an external rotor motor, since through the bearing elements accommodated inside the face insulation shafts of the stator plate pack as well as by an already known external rotor bell-shaped casing (not shown) enclosing the stator, on the one hand, and by the motor flange on the other hand there are present extremely constricted spatial relations. In particular, through the formation according to the invention, and through the seating of the contact lugs 8 there were overcome the problems in the maintenance of the aforedescribed safety distances.

If the motor flange or the apparatus forming the flange consists of metal, then according to the invention there is provided an insulating winding head cover cap 15 (FIG. 4) which is fastened with its central middle opening 16 to the face insulation shaft 5. There the cylindrical added piece of the middle opening 16 either grips around the face insulation shaft 5 from outside, or it grips in another advantageous execution into the interior space of the face insulation shaft 5. In both cases the cover cap 15 is advantageously fixed in the zone of the face insulation shaft 5 by wedging, welding, cementing or the like. According to the invention the winding head cover cap 15 has a connecting opening 17 through which there can occur the plug connection between connecting plug 12 and connecting tongue of the contact lug 8. With use of a motor flange made of an insulating material, the cover cap 15 can be omitted.

In FIG. 5 there is represented a motor flange 18 according to the invention which is fastened with screws through the bores 19 and through the middle opening 16 of the cover cap 15 to the stator 1, it being noted that the screws extend into the interior space of the face insulation shaft 5 for connection thereof. This motor flange as well as other forms of execution of the same, present advantageously in the zone of the contact lug 8, a connecting opening 20, through which, analogously to the cover cap 15, the motor connecting strands can be led.

The connection of the motor can be carried out after the assembling of all the motor components described, by inserting the connecting plug 12 through the openings 17, 20 in the motor flange 18 and in the cover cap 15 onto the connecting tongues 11. Here on arising of a pulling force acting in the direction of the cable the pulling of the plug 12 from the connecting tongue 11 is prevented by the fact that the plugging zone 12a and the clamping zone 12b of the connecting plug 12 are arranged at a right angle to one another, and that the clamping zone 12b with the clamped-on motor strand 12c is led off in radial direction from the stator. In conjunction with the above-described anchoring of the contact lug 8 to the stator 1 there is thus yielded a good tension relief of the connecting place for the avoidance of wire breakages of the thin, deligate winding wire.

A cover 21 represented in FIG. 7 closes the opening in the motor flange 18, so that a touching of the plug contacts as well as any intrusion of foreign objects into the connecting zone is precluded.

Through the advantageous execution of the external rotor motor described it is also possible to provide windings switchable over in voltage. Through the fact that on both face sides of the stator there can be present in each case two added pieces 6a, 6b with, in turn, two receiving slots 7a, 7b in each case, up to four connecting possibilities are made possible. The additionally required motor connection strands are then, to be sure, no longer supplied pluggably from outside, but soldered to the respective contact lugs 8 and led directly over the winding head to the connection side.

It should be pointed out that the present invention is not restricted to the examples of execution represented. It is possible to create further executions without abandoning the inventive concept.

What is claimed is:

1. A stator comprising:
   a stator lamination pack consisting of stacked up individual laminations;
   stator windings;
   said stator lamination pack being provided with grooves for receiving said stator windings;
   a wall of insulation provided between said stator lamination pack and said stator windings;
   a face insulation shaft extending in an axial direction from both opposing first and second faces of said stator lamination pack;
   a motor flange being secured to said first face of said stator lamination pack, said motor flange having an opening therethrough;
   plug connection means for connecting motor connecting leads to ends of said stator windings;
   said plug connection means permitting said motor connecting leads to be connected to said ends of said stator windings through said opening in said motor flange after said motor flange has been secured to said first face of said stator lamination pack;
   said plug connection means including contact lugs and connecting plugs, said connecting plugs receiving said contact lugs for connection therebetween;
   said connecting plugs being secured to said motor connecting leads;
   said contact lugs being secured to said ends of said stator windings;
   said contact lugs being supported on said wall of insulation and facing in a direction toward said motor flange; and
   an insulaitng winding head cover cap being supported on said face insulation shaft, said cover cap having a circular configuration and a central middle opening for receiving said face insulation shaft, said cover cap being disposed between said stator lamination pack and said motor flange.

2. A stator according to claim 1 wherein a cylindrical added piece of said cover cap grips over an outside surface of said face insulation shaft.

3. A stator according to claim 1, wherein a cylindrical added piece of said cover cap grips into an interior surface of said face insulation shaft.

4. A stator according to claim 1, wherein said cover cap is fastened to said face insulation shaft by wedging, cementing and welding.

5. A stator according to claim 1, wherein said cover cap is provided with a rectangular opening to permit said connecting plugs to be connected to said contact lugs when said cover cap is secured to said face insulation shaft.

6. A stator according to claim 5, wherein said opening of said motor flange is rectangular and in alignment with said rectangular opening of said cover cap.

7. A stator according to claim 6, wherein a cover closes said rectangular opening of said motor flange.

8. A stator comprising:
   a stator lamination pack consisting of stacked up individual laminations;
   stator windings;
   said stator lamination pack being provided with grooves for receiving said stator windings;
   a wall of insulation provided between said stator lamination pack and said stator windings;
   a face insulation shaft extending in an axial direction from both opposing first and second faces of said stator lamination pack;
   a motor flange being secured to said first face of said stator lamination pack, said motor flange having an opening therethrough;
   plug connection means for connecting motor connecting leads to ends of said stator windings;
   said plug connection means permitting said motor connecting leads to be connected to said ends of said stator windings through said opening in said motor flange after said motor flange has been secured to said first face of said stator lamination pack;
   said plug connection means including contact lugs and connecting plugs, said connecting plugs receiving said contact lugs for connection therebetween;
   said connecting plugs being secured to said motor connecting leads;
   said contact lugs being secured to said ends of said stator windings;
   said contact lugs being supported on said wall of insulation and facing in a direction toward said motor flange; and
   a cover closing said opening of said motor flange.

* * * * *